Nov. 13, 1956  S. G. JOHNSON  2,770,050
GAGE FOR ROTATING TEST PART FOR PERIPHERAL AND
CONCENTRICITY GAGING
Filed Nov. 21, 1951  2 Sheets-Sheet 1
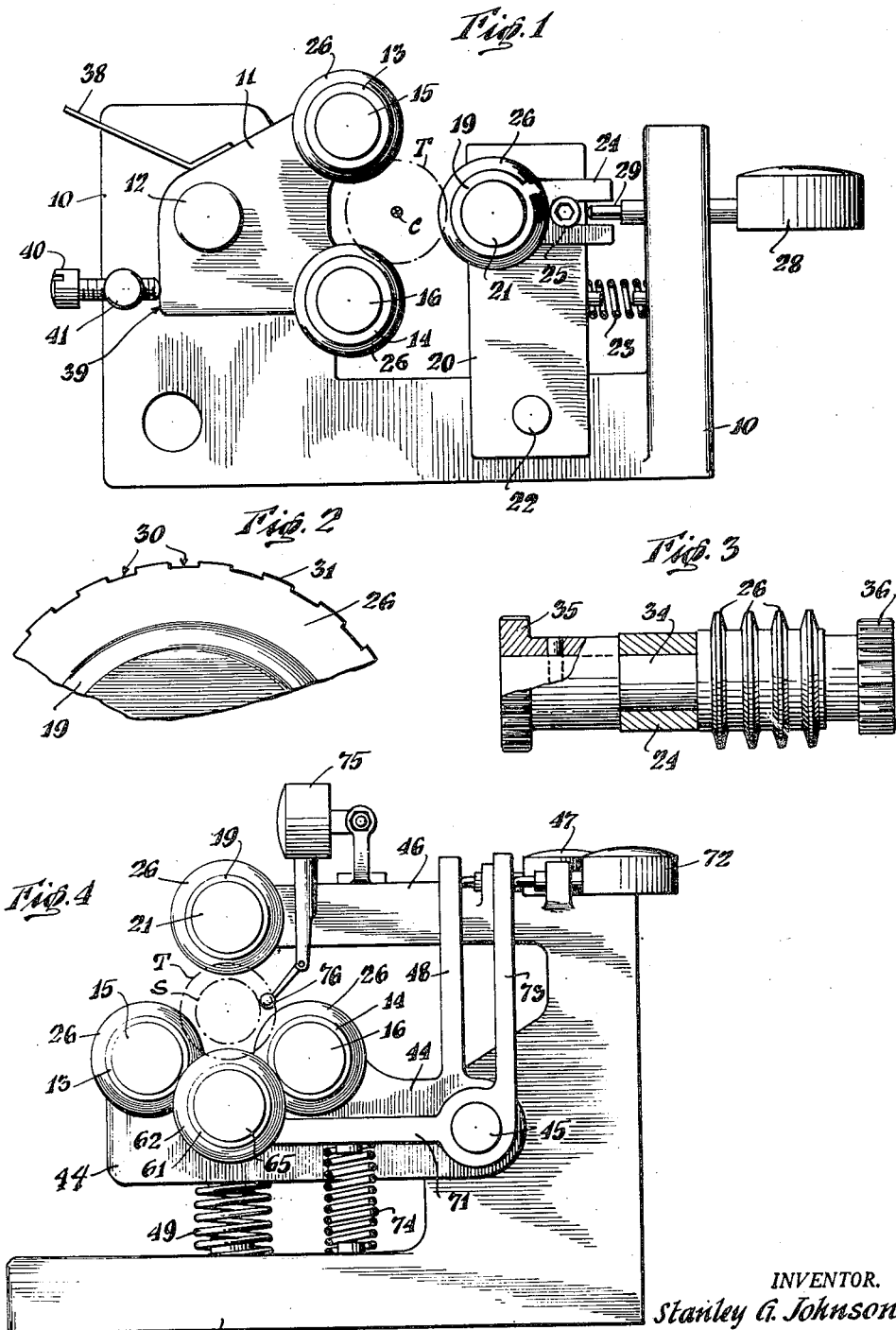
INVENTOR.
Stanley G. Johnson
BY
Bohleber, Jaske H. Montstream
ATTORNEYS

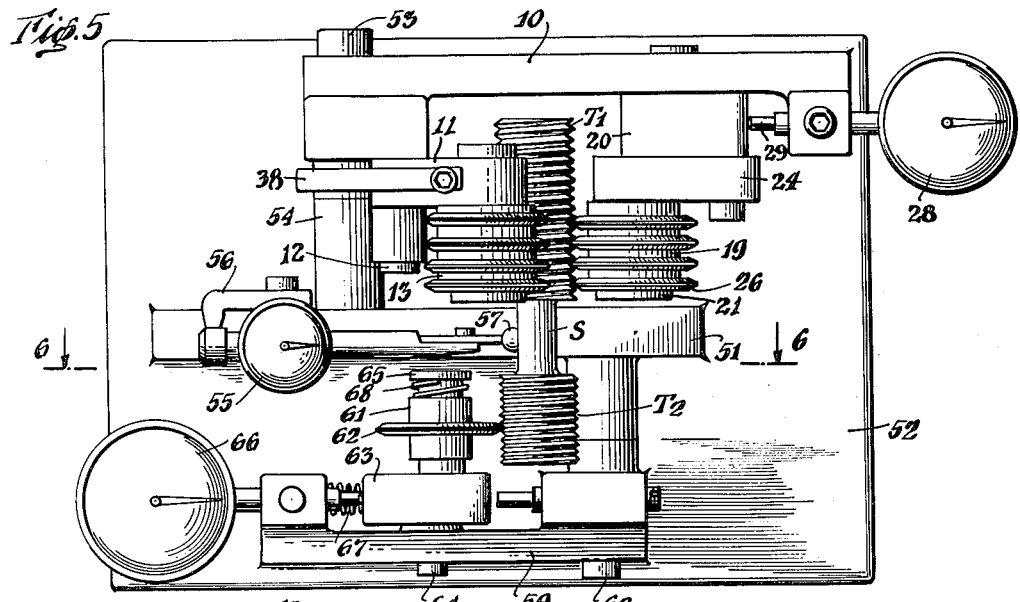
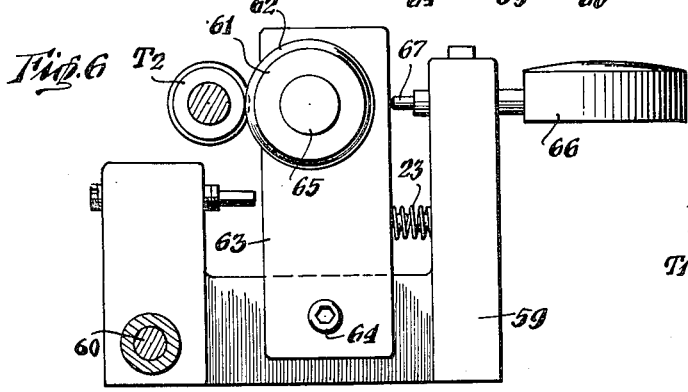
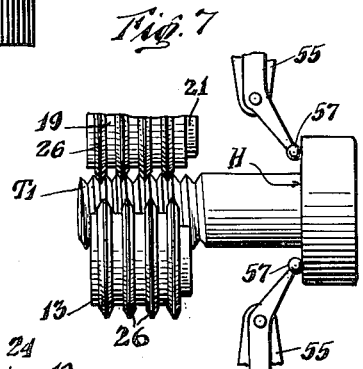
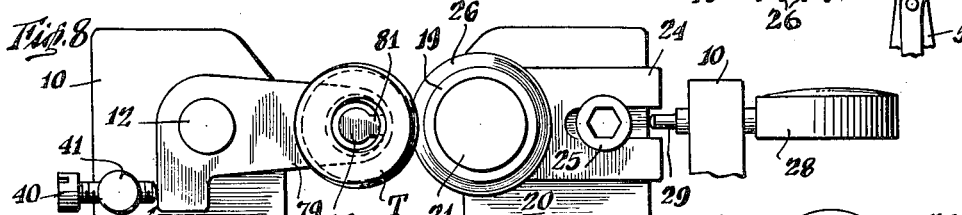
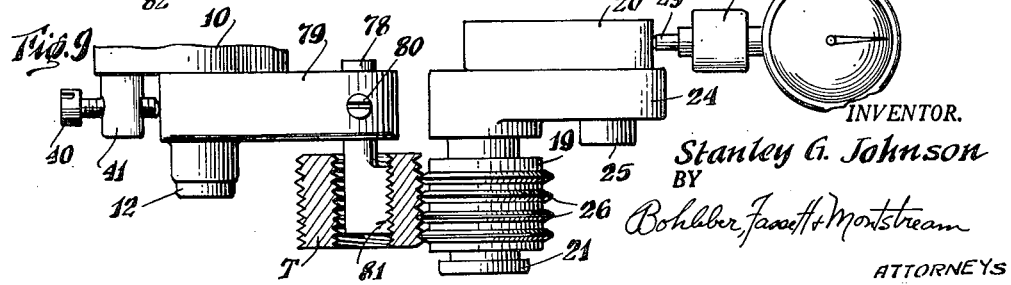

United States Patent Office 2,770,050
Patented Nov. 13, 1956

2,770,050

GAGE FOR ROTATING TEST PART FOR PERIPHERAL AND CONCENTRICITY GAGING

Stanley G. Johnson, West Hartford, Conn., assignor, by mesne assignments, to The Johnson Gage Development Company, a corporation of Connecticut Application November 21, 1951, Serial No. 257,589

14 Claims. (Cl. 33—199)

The invention relates to a gage of relatively inexpensive construction having cooperating gaging means which support a test part in gaging position and at least one of the gaging means includes a gaging roller having means for rotating the roller. Rotation of the gaging roller in turn rotates the test part in gaging position. The gage in an extended form gages the concentricity between an internal and external surface, either of which or both may be plain or threaded. The gage in a more complex form relates to a gage which tests for the concentricity or eccentricity between one external surface or portion of a test part with respect to one or more other external surfaces or portions of the test part, one or more of which surfaces may be plain or threaded or both. The gage may also test the squareness of a shoulder on the test part relatively to a plain or threaded external surface.

It is an object of the invention to construct a gage having gaging means which supports the test part in gaging position including at least one gaging roller which roller is provided with means to rotate the same so that the test part can be rotated thereby while in gaging position.

Another object of the invention is to construct a new and novel gage of simple construction for testing the concentricity or eccentricity or squareness of two or more adjacent surfaces of a test part utilizing a gaging roller to turn the test part while the latter is in gaging position.

Another object is to construct a gage of simple form which tests for the concentricity or eccentricity between exterior and interior portions or surfaces of a test part and at the same time if desired, gaging one of the surfaces either plain or threaded as to its acceptability.

A still further object is to provide a gage for testing the squareness of a shoulder relatively to a cylindrical surface either plain or threaded at the same time that the surface is gaged for acceptability.

Other objects of the invention will be more apparent from the following description when taken in connection with the accompanying drawings illustrating preferred embodiments of the invention in which:

Figure 1 is a side elevation of a simple form of gage having a movably mounted frame, carrying one of the gaging means, the pivotal mounting being provided for inserting the test part into gaging position and a movable gaging means for gaging the test part;

Figure 2 is an enlarged partial view of a rotatable gaging roller having means for rotating the same;

Figure 3 is a partial view of a modified form of means for turning a rotatable gaging roller;

Figure 4 is a plan view of another form of gage having a movable frame for both the insertion of the test part between the gaging means and for gaging the test part and also with means for testing concentricity of two external surfaces on a test part;

Figure 5 is a plan view of a gage for testing the relative concentricity or eccentricity of two or more exterior portions or surfaces of a test part;

Figure 6 is a side view of the portion of the gage of Figure 5 which tests for concentricity or eccentricity between externally threaded surfaces or portions of a test part;

Figure 7 is a partial view showing the set up indicators for testing for squareness of a shoulder relatively to the cylindrical surface or portion, either plain or threaded, of a test part;

Figure 8 is a partial side view of a gage showing the gaging means used for testing the concentricity or eccentricity between an internal surface, shown as threaded, and an external surface, also shown as threaded; and Figure 9 is a partial plan view of the gage of Figure 8.

The simpler form of gage herein is one which provides gaging means which supports the test part in gaging position and one of the gaging means includes a gaging roller mounted for rotation and having means to rotate the roller which in turn rotates the test part when in gaging position thereby presenting the entire periphery of the part to the gaging means without requiring removal of the test part from gaging position and its reinsertion. Many test parts are too small to be turned with the fingers when in gaging position and heretofore had to be removed from gaging position, then turned and reinserted into the gage in order to test another portion of the periphery. Also some test pieces are too short in that their length is coextensive with the length of the gaging means and likewise had to be removed from gaging position in order to present another part of the periphery to the gaging means. Again it is desirable to turn a threaded test part to assure proper seating of the gaging means into a thread.

There are also many test parts in which it is required to test the concentricity or eccentricity of one surface with respect to another. These surfaces may be in adjacent axial relation or one may be internal and the other an external surface. The surfaces may be plain or threaded or combinations thereof. The gage herein provides a simple method of and means for rotating the test part in order to determine the acceptability of the entire periphery thereof. The gage may also be constructed in order to determine the acceptability of a surface or thread and also determine as well the concentricity or eccentricity of one surface with respect to one or more other surfaces upon the test piece. These cylindrical surfaces may be plain or threaded. The gage will also test for an angle between the axes of two surfaces.

The gage shown in Figure 1 includes a gage frame 10 which carries gaging means for supporting and gaging a test part. The gaging means is mounted for movement which may take various forms, that particularly shown in Figure 1 being a pivotal movement of a pivoted frame or member 11 mounted on a pivot 12 carried by the gage frame. For gaging an external surface and supporting the test part in gaging position, the pivoted frame or member carries a pair of spaced gaging means 13 and 14, which may be rollers carried upon pivot means or studs 15 and 16 carried by the pivotal frame or member.

A second or cooperating gaging means is mounted for movement towards and away from the test part T or the pivotally mounted gaging means 13 and 14 when in gaging position as shown in Figure 1. The cooperating gaging means includes at least one roller 19 mounted for rotation on a pivot 21 and, with a movable frame of the type shown in Figure 1, in any suitable fashion for movement toward and from the test part T or the pair of gaging means 13, 14, that shown being a second pivoted frame 20 mounted on a pivot 22 carried by the gage frame 10. A spring 23 is used to project the movable frame and hence the gaging means carried thereby toward the gaging means or rollers 13, 14. The gaging roller 19 may be adjustable upon the pivoted frame 22 by being carried upon a slide 24 mounted upon the pivoted frame and clamped in position by the screw 25. For gaging screw threads the gaging means has gaging ridges 26 to engage the thread. The gaging means are mounted in parallel relation to engage a test part at spaced points around the periphery of the test part.

A dial indicator 28 is used to indicate the position of the pivoted frame 20 by having its operating point 29 contacting therewith which, therefore, indicates the position of the gaging means or roller 19 and hence whether or not the test par T is within the allowable tolerances.

It is essential that at least one of the gaging means be a gaging roller but it is immaterial which of the gaging means is a roller. Means are provided to rotate the gaging roller, if one only is provided, or one of the rollers if more than one of the gaging means are rollers. This means may take the form shown in Figure 2 in which the roller 19 has shallow recesses 30 cut in the gaging surface, or the tips of the gaging ridges 26 if a thread engaging roller to provide projections or roughness on the surface thereof. The recesses may be no more than two thousands of an inch deep which gives sufficient irregularity so that the rollers may be easily turned by the operator's finger. Rotation of the roller rotates the test part T while in gaging position thereby presenting the entire periphery of the test part to the gaging means in gaging position and by watching the movement of the indicator pointer the inspector can determine whether or not there are irregularities in the surface or thread throughout the periphery thereof.

In the construction illustrated in Figure 3, the gage roller may have an extension 34 projecting through the member upon which it is mounted which is shown as the slider 24 and a knurled knob or wheel 35 secured to the end thereof. A knurled knob 36 may be provided at the other end, if desired, with or without the knob 35. Rotation of the knurled knob rotates the gaging roller which in turn rotates the test part as it rests and is supported in gaging position between the gaging means or rollers.

In using the gage of Figure 1, the pivoted frame or cradle 11 with its spaced gaging means 13, 14 is turned upwardly by means of a handle 38 whereupon the test part T is inserted against the spaced rollers and swung to gaging position as illustrated which moves the gaging roller 19 to the right against the pressure of the spring 23. Suitable means are provided to retain or stop the pivotal movement of the pivoted frame 11, and hence the spaced rollers carried thereby, in gaging position, the means shown including a shoulder 39 carried by the pivoted frame which comes into contact with a stop screw 40 threaded through a projection 41 carried by the base frame 10. The indicator is observed for the acceptability of the test part T. The gaging roller 19 is then turned which turns the test part therewith as it rests in gaging position. By observing the indicator any deformities occurring in the surface or thread as the test part is rotated may be observed. It will be noted that the movable or pivoted frame 11 or cradle of the gage of Figure 1 is one which moves or pivots solely for insertion of the test part into gaging position between the gaging means and for removal therefrom. This is because the axis C of the test part when in gaging position is in line or substantially in line between the axes of pivot 12 and of pivot means 21.

Figure 4 illustrates the invention as applied to a different form of gage which includes a gage frame 43 upon which is mounted a movable frame 44, preferably pivoted and carried by a pivot 45 carried by the gage frame. This movable or pivoted frame may carry a pair of spaced gaging means which may be rollers 13, 14 in order to support and gage the test part T. A cooperating gaging means is provided, also shown as a roller 19, carried upon an arm 46 forming a part of the gage frame. The gaging means or rollers 13, 14 and 19 are located in spaced parallel relation and when they are rollers are rotatably mounted upon studs or pivot means 15, 16 and 21 respectively. An indicator 47 engages the pivoted frame 44, such as an extension 48 thereof and by observing the indicator the inspector determines the acceptability of the test piece. At least one of the gaging means is a gaging roller having means for rotating the same. Preferably the gaging means carried by the arm 46 is the rotatable or driving gaging roller 26 and the roller may be of the form shown in Figure 2 or Figure 3. By rotating the roller the test part is rotated in gaging position thereby presenting the entire periphery of the test part to the gaging means. The gaging rollers and their pivot means or studs may be the same as those of Figure 1 and hence are similarly numbered. A spring 49 may press the frame and gaging means 13, 14 upwardly towards the gaging roller 19.

Note that, in the construction of Figure 4, the pivoted frame 44 is depressed so that the test piece may be inserted within or between the gaging means or rollers whereupon the pivoted frame is released to bring the test piece into contact with all of the cooperating gaging means and the position of the gaging means 13, 14 or the frame carrying the same is indicated by the indicator which indicates the acceptability of the test part. The pivoted frame 44 of this construction is, therefore, movable both for insertion of the test part between the gaging means and for performing the gaging function. It is immaterial which of the gaging means has the movement relatively to the other for insertion of the test part between the gaging means and to provide the gaging function or operation on the test part.

Figure 5 illustrates a gage for testing the acceptability of a test part $T_1$ in the manner described in connection with the construction of the gage of Figure 1 and also the concentricity or eccentricity of one or more other exterior portions or surfaces of the test part with respect to each other. In this construction the gage of Figure 1 is secured to a wall 51 carried by and forming a part of a base 52 at a point upon the gage frame 10 spaced from the gaging axis as determined by the center C of the test part. The securing means may be a bolt 53 with spacing washer 54. The gage frame is secured at one point so that the entire frame may be adjusted rotatively at this point for a purpose which will appear more fully hereinafter. The base or its wall 51 carries a second indicator 55 mounted upon the base, such as by a bracket 56, to engage the plain cylindrical surface S of a test part. By rotating one of the rotatable gaging rollers such as roller 19, the test part is turned thereby and by watching the movement of the pointer of the indicator 55 whose operating point 57 engages the surface S, the concentricity or eccentricity of the surface is determined with respect to the portion of the test part which is between the gaging rollers 13, 14 and 19. If no movement of the indicator pointer occurs as the test part is rotated, the plain surface is concentric with the surface or thread between the gaging rollers. If there is movement of the indicator pointer, the amount of relative eccentricity is measured.

The gage may also test the concentricity or eccentricity of a second threaded portion $T_2$ on the test part by providing a second gage frame 59 which is secured to the base 52 at one point such as by means of a bolt 60 threaded into the wall 51 and passing through the frame at a point spaced from the gaging position so that the frame and the gaging means carried thereby are adjustable rotatively on the bolt. This second frame is secured to the base at a point spaced from the point of attachment by bolt 53 of the first gage frame to the base for reasons which will be explained hereinafter. This second gaging frame carries a gaging means, shown as a roller 61 having a single thread engaging ridge 62 which roller is mounted for movement towards and away from the test portion $T_2$ of the test part, the mounting particularly illustrated being a pivoted frame or member 63 mounted on a pivot 64. The gaging roller is rotatably mounted on a pivot means or stud 65 and is also axially movable thereon for threaded test parts to provide for differences in pitch of thread between $T_1$ and $T_2$ and for thread engagement. A spring 68 may press the roller axially on its stud 65. An indicator 66 has its operating point 67 engage a suitable portion of the gaging mechanism that particularly shown being an engagement with the movable or pivoted frame 63.

With a test part T in gaging position, a gaging roller 19 is rotated and the test part is rotated thereby as described hereinbefore. The eccentricity gaging roller 61 moves axially along its stud 65 so that the gaging ridge 62 tracks in the threaded portion $T_2$ as the test piece is rotated. By watching the indicator 66 the concentricity or eccentricity of this second threaded portion with respect to the portion $T_1$ may be observed. If the indicator pointer remains stationary the two portions are concentric and any movement of the indicator measures the amount of eccentricity. It will be noted that with a gaging roller having free axial movement the threads may be of a different pitch. It should also be noted that if the pointer of indicator 66 moves a different amount at one point of the length of the thread $T_2$ from that at another point as the test part is turned, this indicates that the axes of the two threads are at an angle to each other and the difference in the indicator readings is a measure of the amount of angularity.

It has been mentioned hereinbefore that the point of attachment 53 of the gage frame 10 upon the base or base wall 51 is spaced from the point of the attachment 60 of the gage frame 59 with the base wall. Because of this construction the gaging roller 61 may be adjusted as to its position along an arc from the center of the bolt 60 and the position of the gaging means carried by the gage frame 10 may similarly be adjusted along an arc from the center of its securing bolt 53 which arcs are in opposite directions because of the spaced mounting. By adjusting the angular position of each gage frame, the gaging position of one gaging means may be adjusted toward and from the position of the gaging roller 61 of the eccentricity gaging means whereby adjustment may be made for different diameters of test parts with the eccentricity gaging means continuing to contact the periphery of the test part at an effective diameter thereof.

Figure 7 shows the construction for gaging the squareness of a shoulder H of a test part relatively to a surface or thread $T_1$ in which the rollers 13 and 19 are the same parts as shown in Figure 1 which may and preferably do use a first indicator to gage the surface or thread. A second indicator 55 is mounted upon the base to engage the opposite point on the shoulder. As the test part is rotated while supported in gaging position by the gaging means 13, 14, 19, the test part moves axially as it is turned so that the pointed readings of the indicators increase therewith. If the increase is the same for both indicators upon half of a turn of the screw, the shoulder is square with respect to the thread.

The relative concentricity or eccentricity between two or more exterior surfaces either plain or threaded or both may be gaged with the construction of Figure 4 by providing an eccentricity gaging means similar to that shown in Figures 5 and 6. A second movable frame, shown as a pivoted frame 71, is mounted for movement on the pivot 45. The frame carries a gaging means or a fourth roller to engage the test part T which gaging means for a threaded portion may be the gaging roller 61 having a thread engaging ridge 62, and mounted for rotation and axial movement upon the pivot means or stud 65. The position of the movable or pivoted frame and the gaging roller is indicated by an indicator 72, the operating point of which engages an extension 73 forming part of the movable frame 71. The frames 44 and 71 may take many forms, that shown being for illustration. A spring 74 may press the frame 71 in the direction of the first gaging means. For gaging the concentricity of a plain cylindrical surface S, a gaging means formed by an indicator 75 may be suitably secured to the frame or base 43 or the arm 46 thereof having its operating point 76 contacting the surface.

Figures 8 and 9 illustrate a form of construction for testing the concentricity or eccentricity between an exterior thread or surface and an internal thread or surface of a test part T, threaded surfaces being shown. Most of the structure is the same as that of Figure 1 and Figure 5 and like parts are given the same number. In this construction the internal gaging means may be a pin 78 carried by a pivoted frame 79 mounted upon the pivot 12. The pin is secured to the pivoted frame by a lock screw 80 and carries a gaging surface 81, which, for testing an internal thread, is a peripheral portion of a corresponding or mating external screw thread. The pivoted frame 79 is substituted in place of the pivoted frame 11 of Figure 1 or Figure 5 for inserting the test part upon the gaging means and to swing the same to gaging position in contact with the second gaging means or roller 19. The frame 79 pivots solely for insertion of the test part within the gage. The roller 19 may have a single thread engaging ridge 26 or several as desired. The mounting for the gaging roller is the same as that of Figure 1 or Figure 5; however, the roller pivot mounting or stud provides for substantial axial movement thereon to accommodate for differences in the pitch of threads or for lack of alignment of the external and internal thread of the same pitch. When the internal gaging means and movable frame of Figure 7 is substituted for the frame 11 of Figure 5, the concentricity or eccentricity between an internal surface or thread and an adjacent external surface can be determined.

Because of the shortness of the test piece it is difficult to turn the same in gaging position without means for turning a gaging roller. By turning the gaging roller 19, the test part T is rotated therewith when supported in gaging position to present the entire periphery of the test part to the gaging means. If there is gradual movement of the indicator as the test part is rotated through a half turn, variation in the wall thickness of the test part is indicated which variation is occasioned by eccentricity between the inner surface and the outer surface or threads whatever the surface form may be on the test part. A sudden change in the indicator reading is indicative of another thread fault.

The gage for testing concentricity or eccentricity between an internal surface and external surface may be constructed in the form of gage shown in Figure 4 in which the internal gaging means or pin 78 is carried by the movable frame 44 and substituted for the pair of gaging rollers 13, 14 for movement of this gaging means for both insertion of the test part between the gaging means and for gaging the test part.

In the gages described herein at least one of the gaging means is a gaging roller which has means for rotation of the same whereby the test part when in gaging position is rotated thereby to present its entire periphery to the gaging means. It is immaterial which of the gaging means is the rotatable roller or includes a rotatable roller although for small internal surfaces a roller may have insufficient room. In all constructions illustrated there is at least one movable frame, preferably pivoted, enabling insertion of the test part between or within the gaging means at gaging position where the test part is supported by the gaging means and rotated by a gaging roller of the gaging means.

This invention is presented to fill a need for improvements in gage for rotating test part for peripheral and concentricity gaging. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for gaging a test part comprising a gage frame, a movable frame mounted upon the gage frame, a first gaging means carried by the movable frame, a second gaging means carried by the gage frame and cooperating with the first gaging means to gage the test part, the two gaging means engaging the test part circumferentially at least at points greater than 180 degrees to support a test part in gaging position and providing the sole support for the test part, at least one of the gaging means including a gaging roller, means mounting the gaging roller for rotation, means to manually rotate a gaging roller for rotating a test part in gaging position, and an indicator carried by the gage frame and connected with the movable gaging means for gaging the test part.

2. A gage for gaging a test part comprising a gage frame, a first gaging means carried by the gage frame, a second gaging means carried by the gage frame and cooperating with the first gaging means to gage the test part, the two gaging means engaging the test part circumferentially at least at points greater than 180 degrees to support a test part in gaging position and providing the sole support for the test part, means mounting at least one of the gaging means for movement to insert a test part within the gaging means and to gage the test part, at least one of the gaging means including a gaging roller, pivot means mounting the gaging roller for rotation, means to manually rotate a gaging roller for rotating the test part in gaging position, and an indicator carried by the gage frame and connected with the gaging means having a gaging movement to indicate the position thereof.

3. A gage for gaging a test part comprising a gage frame, a movable frame pivotally mounted upon the gage frame, gaging means including a pair of gaging rollers, means mounting the gaging rollers upon the movable frame for rotation and in parallel spaced relation to support a test part at spaced points around the periphery thereof, and providing the sole support for the test part, cooperating gaging means including at least one gaging roller, means carried by the gage frame to rotatably mount the third gaging roller thereon in parallel spaced relation to the pair of gaging rollers, the gaging rollers being spaced around the periphery of the test part greater than 180 degrees, means mounting one of the gaging means for gaging movement towards and away from the other, means to rotate one of the gaging rollers for rotating the test part in gaging position, and an indicator connected with the gaging means having gaging movement to indicate the position thereof and gage the test part.

4. A gage for gaging a test part comprising a gage frame, gaging means including a pair of gaging rollers, means mounting the gaging rollers upon the frame for rotation and in parallel spaced relation to support a test part at spaced points around the periphery thereof, and providing the sole support for the test part, cooperating gaging means including at least one gaging roller, pivot means carried by the gage frame to rotatably mount the gaging roller of the cooperating gaging means thereon in parallel spaced relation to the pair of gaging rollers, the gaging rollers being spaced around the periphery of the test part greater than 180 degrees, means mounting at least one of the gaging means for movement toward and away from the other gaging means to insert a test part within the gaging means and to gage the test part, means to manually rotate one of the gaging rollers for rotating the test part in gaging position, and an indicator connected with the gaging means having a gaging movement to indicate the position thereof and gage the test part.

5. A gage for gaging a test part having adjacent portions comprising a gage frame, gaging means including a pair of gaging rollers, means mounting the gaging rollers upon the frame for rotation and in parallel spaced relation to support a test part at spaced points around the periphery thereof, and providing the sole support for the test part, cooperating gaging means including at least one gaging roller, means carried by the gage frame to rotatably mount the third gaging roller of the cooperating gaging means thereon in parallel spaced relation to the pair of gaging rollers, the gaging rollers being spaced around the periphery of the test part greater than 180 degrees, means mounting at least one of the gaging means for movement towards and away from the other gaging means to insert a test part within the gaging means and to gage the test part, means to manually rotate one of the gaging rollers for rotating the test part, an indicator connected with the gaging means having a gaging movement, and at least one indicator carried by the gage frame for engaging an adjacent portion of the test part.

6. A gage for gaging a test part having axially adjacent essentially cylindrical portions comprising a gage frame, gaging means including a pair of gaging rollers, pivot means mounting the gaging rollers upon the frame for rotation and in parallel spaced relation to engage a test part at spaced points around the periphery thereof, cooperating gaging means including at least one gaging roller, pivot means carried by the gage frame to rotatably mount the gaging roller of the cooperating gaging means thereon in parallel spaced relation to the pair of gaging rollers, the gaging rollers being spaced around the periphery of the test part greater than 180 degrees, means mounting at least one of the gaging means for movement towards and away from the other gaging means to insert a test part within the gaging means and to gage the test part, means to manually rotate one of the gaging rollers for rotating the test part, an indicator connected with the gaging means having a gaging movement to indicate the position thereof and gage the test part, a fourth gaging roller, pivot means mounting the fourth gaging roller for rotation, means mounting the pivot means for the fourth gaging roller for movement towards and away from the gaging axis and spaced in an axial direction from but adjacent the other gaging means to engage the adjacent cylindrical portion of the test part, and an indicator carried by the frame and engaging the mounting means to indicate the position thereof and of the fourth gaging roller.

7. A gage for gaging a test part having axially adjacent threaded portions comprising a gage frame, gaging means including a pair of thread gaging rollers, pivot means mounting the gaging rollers upon the frame for rotation and in parallel spaced relation to engage a test part at spaced points around the periphery thereof, cooperating gaging means including at least one thread gaging roller, pivot means carried by the gage frame to rotatably mount the gaging roller of the cooperating gaging means thereon in parallel spaced relation to the pair of gaging rollers, means mounting at least one of the gaging means for movement towards and away from the other gaging means to insert a test part within the gaging means and to gage the test part, means to rotate one of the gaging rollers for rotating the test part, an indicator connected with the gaging means having a gaging movement to indicate the position thereof and gage the test part, a fourth thread gaging roller, pivot means mounting the fourth gaging roller for rotation and for axial movement, mounting means mounting the pivot means for the fourth gaging roller for movement towards and away from the gaging axis and the adjacent thread of the test part, and an indicator carried by the gage frame and engaging the mounting means to indicate the position thereof and of the fourth gaging roller.

8. A gage for gaging a test part having axially adjacent threaded portions comprising a gage frame, a pivoted frame, means pivotally mounting the pivoted frame on the gage frame, gaging means including a pair of thread gaging rollers, pivot means mounting the gaging rollers upon the pivoted frame for rotation and in parallel spaced relation to engage a test part at spaced points around the periphery thereof, cooperating gaging means including at least one thread gaging roller, pivot means to rotatably mount the gaging roller of the cooperating gaging means thereon in parallel spaced relation to the pair of gaging rollers, a second pivoted frame mounting the cooperating gaging roller and its pivot means for movement towards and away from the other gaging means to gage the test part, means to rotate one of the gaging rollers for rotating the test part, an indicator connected with the cooperating gaging means, a fourth thread gaging roller, pivot means mounting the fourth gaging roller for rotation and for axial movement, a third pivoted frame mounting the pivot means for the fourth gaging roller adjacent one of the other pivoted frames for movement towards and away from the gaging axis and the adjacent thread of the test part, and an indicator carried by the gage frame and engaging the third pivoted frame to indicate the position thereof and of the fourth gaging roller.

9. A gage for gaging a test part having an axially adjacent external plain and threaded portions comprising a gage frame, gaging means including a pair of thread gaging rollers, pivot means mounting the gaging rollers upon the frame for rotation and in parallel spaced relation to engage a test part at spaced points around the periphery thereof, cooperating gaging means including at least one thread gaging roller, pivot means to rotatably mount the gaging roller of the cooperating gaging means and its pivot means thereon in parallel spaced relation to the pair of gaging rollers, means mounting at least one of the gaging means for movement toward and away from the other gaging means to insert a test part within the gaging means and to gage the test part, means to rotate one of the gaging rollers for rotating the test part, an indicator connected with the gaging means having a gaging movement, a fourth thread gaging roller, pivot means mounting the fourth gaging roller for rotation and for axial movement, mounting means mounting the pivot means for the fourth gaging roller for movement towards and away from the gaging axis and the adjacent thread of the test part, and an indicator carried by the gage frame and engaging the mounting means to indicate the position thereof and of the fourth gaging roller, and a third indicator carried by the gage frame for engaging the plain external surface.

10. A gage for gaging a test part having axially adjacent portions comprising a base, a first gage frame, gaging means including a pair of gaging rollers, pivot means mounting the gaging rollers upon the frame for rotation and in parallel spaced relation to engage a test part at spaced points around the periphery thereof, cooperating gaging means including at least one gaging roller, pivot means to rotatably mount the gaging roller for the cooperating gaging means thereon in parallel spaced relation to the pair of gaging rollers, means mounting at least one of the gaging means for movement towards and away from the other gaging means to insert a test part within the gaging means and to gage the test part, means to rotate one of the gaging rollers for rotating the test part, an indicator connected with the gaging means having a gaging movement, securing means carried by the first gage frame spaced from the gaging means to secure the same to the base for rotary adjustment, a second gage frame, a fourth gaging roller, pivot means mounting the fourth gaging roller for rotation, mounting means mounting the pivot means for the fourth roller axially spaced from the first gaging means for movement toward and from the test part, an indicator carried by the second gage frame and engaging the mounting means to indicate the position thereof and the fourth gaging roller, and means carried by the second gage frame spaced from the gaging means and securing the same to the base and for rotary adjustment at a point spaced from the securing means for the first gage frame.

11. A gage comprising a gage frame, a pivoted frame, gaging means including a pair of spaced gaging rollers, means mounting the gaging rollers upon the pivoted frame for rotation and in parallel spaced relation to engage a test part at spaced points around the periphery thereof, pivot means carried by the gage frame mounting the pivoted frame for pivotal movement of the gaging means carried thereby toward and away from cooperating gaging means to insert a test part within the gaging means and to gage the test part, cooperating gaging means including a gaging roller, pivot means carried by the gage frame to rotatably mount the gaging roller of the cooperating gaging means thereon in parallel spaced relation to the pair of gaging rollers, the gaging rollers supporting the test part in gaging position and providing the sole support for the test part, means to rotate one of the gaging rollers for rotating the test part, and an indicator connected with the pivot frame to indicate the position thereof and of the gaging rollers.

12. A gage as in claim 11 including gaging means carried by the frame in adjacent relation to the first gaging means to contact an axially adjacent surface on the test part.

13. A gage comprising a gage frame, a pivoted frame, gaging means including a pair of spaced gaging rollers, means mounting the gaging rollers upon the pivoted frame for rotation and in parallel spaced relation to engage a test part at spaced points around the periphery thereof, pivot means carried by the gage frame mounting the pivoted frame for pivotal movement of the gaging means carried thereby toward and away from cooperating gaging means to insert a test part within the gaging means and to gage the test part, cooperating gaging means including a gaging roller, pivot means carried by the gage frame to rotatably mount the gaging roller of the cooperating gaging means thereon in parallel spaced relation to the pair of gaging rollers, the gaging rollers supporting the test part in gaging position and providing the sole support for the test part, means to rotate one of the gaging rollers for rotating the test part, and an indicator connected with the pivoted frame to indicate the position thereof and of the gaging rollers, a second pivoted frame, pivot means carried by the gage frame mounting the second pivoted frame adjacent to the other pivoted frame, a gaging roller, means mounting the gaging roller upon the second pivoted frame for rotation and axial movement to engage an adjacent portion of the test part, and an indicator carried by the gage frame and engaging the second pivoted frame to indicate the position of the gaging roller carried thereby.

14. A gage as in claim 11 including a second indicator mounted on the gage frame to engage the test part at an adjacent portion thereof.

References Cited in the file of this patent

UNITED STATES PATENTS

| | | |
|---|---|---|
| 1,818,968 | Anderson | Aug. 18, 1931 |
| 2,030,237 | Brittain et al. | Feb. 11, 1936 |
| 2,290,045 | Harley et al. | July 14, 1942 |
| 2,370,503 | Straw | Feb. 27, 1945 |
| 2,470,404 | Kloos | May 17, 1949 |
| 2,531,317 | Baney et al. | Nov. 21, 1950 |
| 2,566,356 | Niper | Sept. 4, 1951 |
| 2,586,053 | Johnson | Feb. 19, 1952 |
| 2,668,362 | Johnson | Feb. 9, 1954 |
| 2,696,675 | Case | Dec. 14, 1954 |